July 21, 1964     CARL-HERMANN HEISE     3,141,576
MOVABLE STORAGE BIN AND HOPPER Filed Jan. 19, 1962     2 Sheets-Sheet 1

INVENTOR
CARL-HERMANN HEISE

By Toulmin & Toulmin
Attorneys

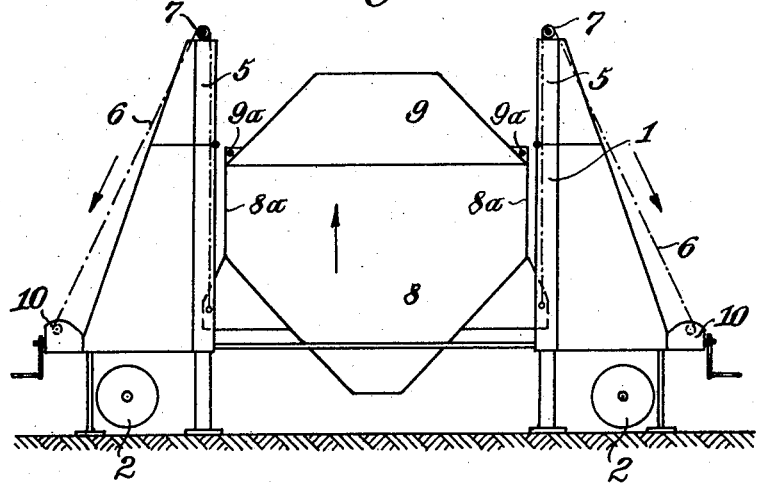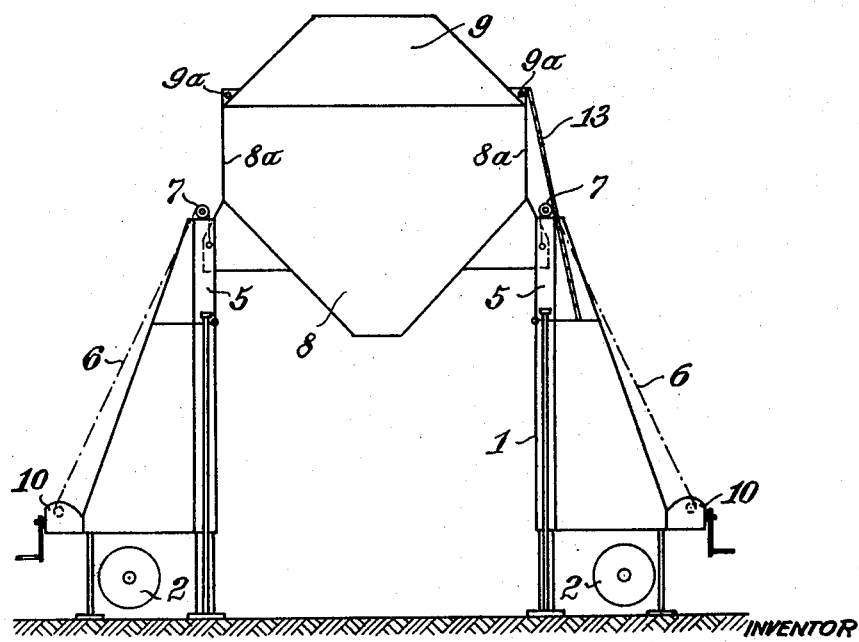

3,141,576
MOVABLE STORAGE BIN AND HOPPER
Carl-Hermann Heise, 12 Kalandstrasse,
Alfeld (Leine), Germany
Filed Jan. 19, 1962, Ser. No. 167,264
1 Claim. (Cl. 222—160)

The present invention relates to a movable storage bin of the type used for storing and loading bituminous road-building materials, more particularly to an improvement in such a storage bin whereby the overall height of the apparatus can be reduced when the apparatus is being moved from one installation to another.

A movable storage bin is commonly used on road-building projects for storing bituminous road-building materials therein and then functioning as a hopper by discharging these materials into trucks which are driven underneath the bin. It is desirable that such storage bin plants be made movable so that they can be readily transported from one installation to another either by road or by rail.

One such form of an apparatus comprises a frame having front and rear parts which are supported on wheels and a central part comprising a storage bin which is slidably mounted therebetween for vertical displacement with respect to the frame. In its lowest position the central portion or storage bin connects the other two parts of the frame to form a complete unit which can be readily moved from one installation to another. In the highest position of the storage bin it forms a rigid supporting framework with the other parts of the frame but is sufficiently high to provide a passage therebetween for trucks which are to be loaded from the bin acting as a hopper.

In view of the large capacity outputs of modern road-building machinery, the storage capacity of such storage bins must be increased correspondingly. However, an increase in the volumetric capacity of the storage bin results in an increase in the exterior dimensions of the storage bin so that the overall size of the apparatus exceeds the dimensions for apparatus which are to be transported by rail or on roads.

It is therefore the principal object of the present invention to provide a movable storage bin apparatus which has an increased storage capacity but whose exterior dimensions are well within the limits permissible for vehicles in both rail and road transportation.

The object of the present invention is obtained by constructing the storage bin in two parts which are telescopingly mounted with respect to each other. In this apparatus the lower part of the storage bin is slidably mounted between front and rear parts of the frame in a manner as described above. The upper portion of the storage bin, however, is slidably mounted within the lower portion of the bin so that the storage bin is extensible. By withdrawing the upper portion of the bin from the lower portion thereof, the full volumetric capacity of the storage bin can be utilized. This, however, need only be done when the apparatus is being assembled in its installation.

In order to further decrease the overall height of the apparatus for transportation purposes, the upper ends of the front and rear parts of the frame are made collapsible. When these collapsible upper ends are in their extended positions, cables pass over pulleys mounted thereon to connect the slidable upper portion of the bin with suitable winches.

Other objects and advantages of this invention will be apparent upon reference to the accompanying description when taken in conjunction with the following drawings, wherein FIGURE 1 is a side elevational view of the movable storage bin of this invention showing the position of the parts thereof when the apparatus is to be transported;

FIGURE 3 is a view similar to that of FIGURE 1 and showing the storage bin with the upper portion thereof being extended with respect to the lower portion; and FIGURE 4 is a view similar to that of FIGURE 1 but showing the storage bin in position for discharging materials into trucks running underneath by acting as a hopper.

Figure 1:
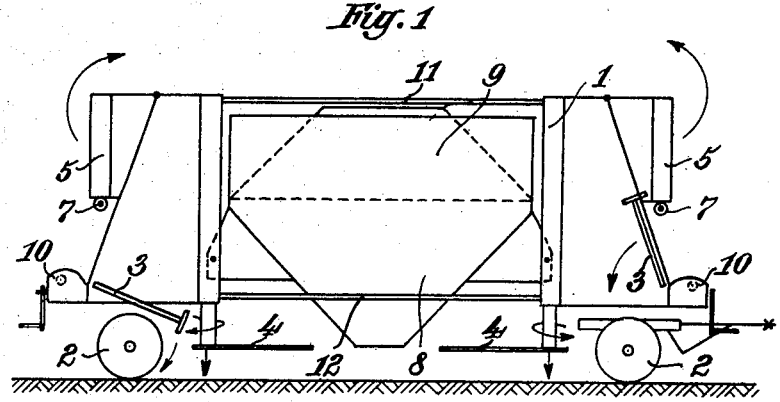

Returning now to the drawings wherein like reference symbols indicate the same parts throughout the various views, there is shown in FIGURE 1 the apparatus of this invention and comprising a frame 1 having a front part 1a and a rear part 1b. These frame parts are mounted on wheels 2. Supporting props 3 are pivotally mounted on both the front and rear frame parts 1a and 1b and can be pivoted downwardly as shown so as to support the full weight of the apparatus in the installed position and to relieve the tires on the wheels from having any weight thereon.

Interior props or legs 4 are telescopingly mounted within the front and rear frame parts and can be extended to their supporting positions by rotating them through an angle of about 90°.

The upper ends of the front and rear frame parts are indicated at 5 and are pivotally mounted thereon so as to reduce the overall height of the apparatus when pivoted into the positions as shown in FIGURE 1. The upper ends 5 are pivoted in the direction shown by the arrows when the apparatus is being installed in an operating position.

A storage bin is positioned between the frame parts 1a and 1b and comprises a lower portion 8 which is slidably mounted between these frame parts for vertical displacement. The lower portion 8 has vertically upstanding walls 8a at the upper end thereof. An upper portion of the storage bin and hopper indicated at 9 is telescopingly arranged within the vertical side walls 8a. The upper storage bin and hopper portion 9 has attaching points 9a to which are attached cables 6. The cables 6 pass over pulleys 7 mounted on the top of the upper ends 5 and to a winch or windlass 10. Four of these cables and their corresponding components are provided.

Upper and lower cross braces 11 and 12 are provided between the front and rear frame parts 1a and 1b. These cross braces add rigidity to the apparatus when it is being moved. However, these cross braces are removed when the apparatus is to be assembled in an installation.

Figure 2:
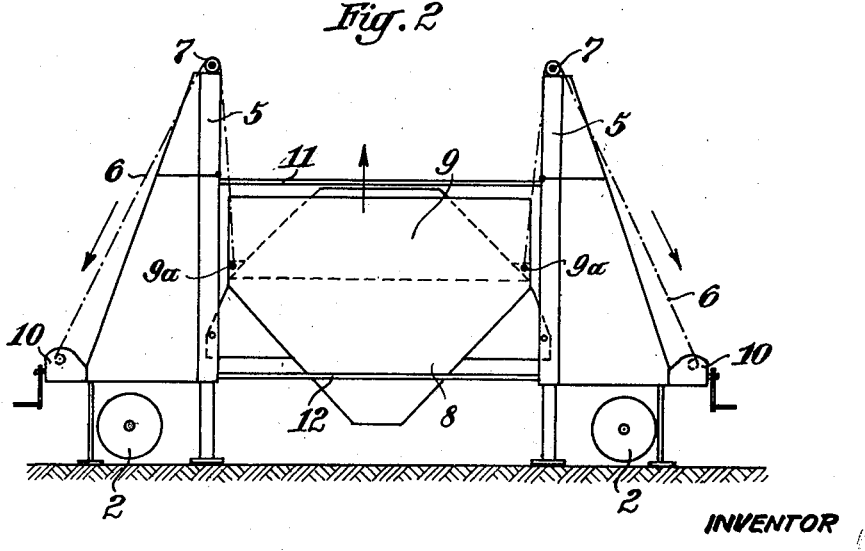
FIGURE 2 is a view similar to that of FIGURE 1 but showing the arrangement of the parts for extending the storage bin.

When the movable storage bin of this invention arrives on an installation, the components thereof are essentially in the positions as illustrated in FIGURE 1. The sequence in which the several components are adjusted to their operating positions are illustrated in FIGURES 2, 3 and 4.

The props 3 and 4 are first pivoted into their supporting positions as described above. The upper ends 5 of the frame parts 1a and 1b are then pivoted to their upright positions as shown in FIGURE 2. Four cables are then passed over the pulleys 7 and connected to the corners of the storage bin upper portion as indicated at 9a. By operating the winches 10 the cables are pulled in the directions of the arrows shown in FIGURES 2 and 4 and the upper portion 9 of the storage bin is withdrawn to the position as shown in FIGURE 3. The upper portion of the storage bin 9 is then secured by bolts in its uppermost position to extend volumetric capacity of the storage bin.

In order to elevate the extended storage bin to its operating position where it can function as a hopper, the cables 6 are attached to the lower portion of the bin part 8 as can be seen in FIGURES 3 and 4. The storage bin is then elevated to its uppermost position as shown in FIGURE 4 by actuation of the winches 10. Prior to the elevation of the storage bin the cross braces 11 are removed. After the storage bin has been elevated the cross braces 12 are removed. All four of the cross braces 11 and 12 are connected with the frame parts and the support props 4 in order to provide additional lateral support for the assembled installation.

An upper end of a ladder as indicated at 13 may be attached to the upper storage bin portion 9 immediately before the storage bin is elevated to the position shown in FIGURE 4. The ladder provides access to the top of the storage bin for inspection and other purposes.

Thus it can be seen that the present invention provides a movable storage bin which is movable between installations and which has an increased volumetric capacity but whose exterior dimensions are not increased. As a result, this larger capacity apparatus can be transported along roads and rails since it does not exceed the limit of dimensions for vehicles transported by these two transportation facilities.

It will be understood that this invention is susceptible to modification in order to adapt it to different usages and conditions and, accordingly, it is desired to comprehend such modifications within this invention as may fall within the scope of the appended claim.

What is claimed as this invention is:

A movable storage bin apparatus comprising an upright frame having spaced front and rear supports, wheels on both of said supports to render the apparatus movable, a storage bin slidably mounted between said front and rear supports by means suspending said bin from each side thereof adjacent said front and rear supports and means connected to said suspending means for moving said bin from a lower position to an elevated dispensing position for filling vehicles that may be driven thereunder, said bin comprising upper and lower portions having telescoping relation to each other to vary the capacity thereof, and the lower portion of said bin having walls converging downward to a discharge means, said bin having an inlet opening at its upper end, said front and rear supports of said frame being free of connecting supports below the lower end of said bin when said bin is in said elevated position whereby vehicles for loading may be driven beneath said bin between said spaced front and rear supports.

References Cited in the file of this patent

UNITED STATES PATENTS

| | | |
|---|---|---|
| 2,655,114 | Holdeman et al. | Oct. 13, 1953 |
| 2,738,904 | Poynor | Mar. 20, 1956 |
| 2,915,331 | Dempster et al. | Dec. 1, 1959 |

FOREIGN PATENTS

| | | |
|---|---|---|
| 1,236,765 | France | June 13, 1960 |